(12) United States Patent
Blanc et al.

(10) Patent No.: US 6,667,955 B1
(45) Date of Patent: Dec. 23, 2003

(54) SWITCHING FABRIC SYSTEM HAVING AT LEAST ONE SUBSYSTEM INCLUDING SWITCH CORE ELEMENTS ARRANGED IN PORT EXPANSION ARCHITECTURE

(75) Inventors: Alain Blanc, Tourrettes sur Loup (FR); Sylvie Gohl, La Colle sur Loup (FR); Alain Pinzaglia, St. Laurent du Var (FR); Menahem Kaplan, Petah-Tikva (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/315,907

(22) Filed: May 20, 1999

(30) Foreign Application Priority Data

Aug. 28, 1998 (EP) ............................. 98480055

(51) Int. Cl.[7] .................................................. H04J 1/16
(52) U.S. Cl. ...................... 370/220; 370/221; 370/225; 370/395.1
(58) Field of Search ................................ 370/220, 216, 370/225, 244, 221, 389, 390, 392, 393, 395.1, 396, 397, 398, 395.31

(56) References Cited

U.S. PATENT DOCUMENTS

| | | | | |
|---|---|---|---|---|
| 4,087,654 A | * | 5/1978 | Mueller | 370/291 |
| 4,922,486 A | * | 5/1990 | Lidinsky et al. | 340/5.74 |
| 5,729,685 A | * | 3/1998 | Chatwani et al. | 370/254 |
| 5,821,875 A | * | 10/1998 | Lee et al. | 340/2.21 |
| 5,909,427 A | * | 6/1999 | Manning et al. | 370/219 |
| 5,964,837 A | * | 10/1999 | Chao et al. | 709/224 |
| 6,115,381 A | * | 9/2000 | Benenti et al. | 370/395.21 |
| 6,151,301 A | * | 11/2000 | Holden | 370/232 |
| 6,178,172 B1 | * | 1/2001 | Rochberger | 370/395.32 |
| 6,226,261 B1 | * | 5/2001 | Hurtta et al. | 370/216 |
| 6,298,040 B1 | * | 10/2001 | Aoyagi et al. | 370/219 |
| 6,327,243 B1 | * | 12/2001 | Gregorat | 370/218 |

* cited by examiner

*Primary Examiner*—Hassan Kizou
*Assistant Examiner*—David Odland
(74) *Attorney, Agent, or Firm*—Carlos Munoz-Bustamante; Joscelyn G. Cockburn (57) ABSTRACT

A Switch Fabric system comprising at least one Switch Fabric subsystem (100, 200) further including a set of Switch cores elements (111, 112, 121, 122) that are mounted in a port expansion permitting attachment of at least a first and second sets of Protocol Adapters (1, 2) under a routing control process. A Primary Switch controller (PSC) has a complete knowledge of the topology of the switch, e.g., the number of subsystems, the nature of the port expansion etc., while each Secondary Switch Controller only has a limited knowledge of that topology. One particular Switch Core (111, 211) which has a full-duplex communication capability in each Subsystem is assigned the key function to interface communication between the PSC and the other SSC in a same Switch Fabric Subsystem.

9 Claims, 3 Drawing Sheets

Fault Tolerant

FIG. 1

Fault Tolerant  FIG. 2

FIG. 3

SWITCHING FABRIC SYSTEM HAVING AT LEAST ONE SUBSYSTEM INCLUDING SWITCH CORE ELEMENTS ARRANGED IN PORT EXPANSION ARCHITECTURE

CROSS-REFERENCED TO RELATED PATENT APPLICATIONS

The following European Patent application numbers are cross-referenced:

European patent application no. 97480057.5 filed on Aug. 19, 1997 entitled "Switching System Comprising Distributed Elements Allowing Attachment to Line Adapters, and Having Multicasting Capabilities" describes the detail of the techniques used for building large Switching architectures with sophisticated SCAL elements.

European application no. 97480056.7.

European application no. 97480065.8.

European application no. 96480129.4.

European application no. 96480120.3.

European application no. 98480039.1, filed on May 29, 1998 and entitled "Switching Architecture Comprising Two Switch Fabrics".

European Application no. 97480100.3, from A. Blanc et al., filed on Dec. 30, 1997, and entitled "Port Expansion Architecture for Large Cell Switch".

European Application no. 97480098.9, from A. Blanc et al., filed on Dec. 30, 1997, and entitled "Process for Transporting and Routing a Cell in a Switching Structure Based on a Single Storage Switch".

European Application no. 97480101.1, from A. Blanc et al., filed on Dec. 30, 1997, and entitled "Congestion Management in Very Large Switching Fabrics".

European Application no. 97480099.7, from A. Blanc et al., filed on Dec. 30, 1997, and entitled "Optional Back Pressure in ATM Switching Fabric".

European Application no. 98480007.8, from A. Blanc et al., filed on Feb. 19, 1998, and entitled "Flow Control Process for a Switching System, and System for Performing the Same".

European Application no. 98480006.0, from A. Blanc et al., filed on Feb. 19, 1998, and entitled "Flow Control Process for a Switching Architecture Using an Out-of-Band Flow Control Channel, and Apparatus for Performing the Same".

European Application no. 98480039.1, from A. Blanc et al., filed on May 29, 1998, and entitled "Switching Architecture Comprising Two Switch Fabrics" discloses a switchover when a maintenance operation is planned in one component of the active Switch over.

European Application no. 98480040.9, from A. Blanc et al., filed on May 29, 1998, and entitled "Fault Tolerant Switching Architecture" discloses a second case of switchover that is arranged when a breakdown condition occurs in one Switch Fabric.

1. Field of the Invention

The invention relates to switching systems and, more particularly, to a Switch Fabric system which comprises at least one Switch Fabric subsystem including a set of Switch core elements being arranged in port expansion architecture.

2. Background Art

Shared buffer switches have been shown to be of great interest for switching small packets of data and well adapted to the switching of Asynchronous Transfer Mode (ATM) cells although they are not limited to the ATM technology. Basically, a shared buffer switch comprises a cell storage which is used for storing the cells which are entering through one input port of the switch. An appropriate mechanism is used for extracting the cell from the shared buffer and for directing the latter to one or more output ports of the switch. By using different output queues, each one dedicated to one output port of the switch, it is made possible to achieve a very simple multicasting effect in the switching process. Additionally, the provision of Switch Core Access Layer (SCAL) elements combined with a centralized switching system, the SCAL being located remote, allows an increasing traffic to be transported through the latter.

The high speed requirements of switching systems—resulting of a huge amount of these small cells to be switched per period—tend to force the known technology well beyond its possibilities and physical limits. Special arrangements had to be designed for going beyond the physical limit of the today technology. This was basically achieved by expanding the switching architecture in three directions.

A first way is what is known under the concept of speed expansion which allows an effective combination of several distinctive individual switching modules together; e.g., four modules, in order to form an aggregate high-rate Switching structure or Switch Core. To achieve this, the cell is divided in separate Logical Units (LU) and each one is directed to one switching module. By means of an appropriate mechanism, the four modules can be coupled and synchronized under the control of a master module which permits simultaneous routing of the four LUs towards the same destination port. This obviously permits increasing the overall switching speed, although the semiconductor technology remains unchanged.

These documents disclose the internal control of the different modules by a single master module in accordance with a bit map value introduced in the cell when the latter arrives into the switch core. The particular value that is introduced is extracted from a Routing Control Table that is associated with the master switching module.

Figure 1:
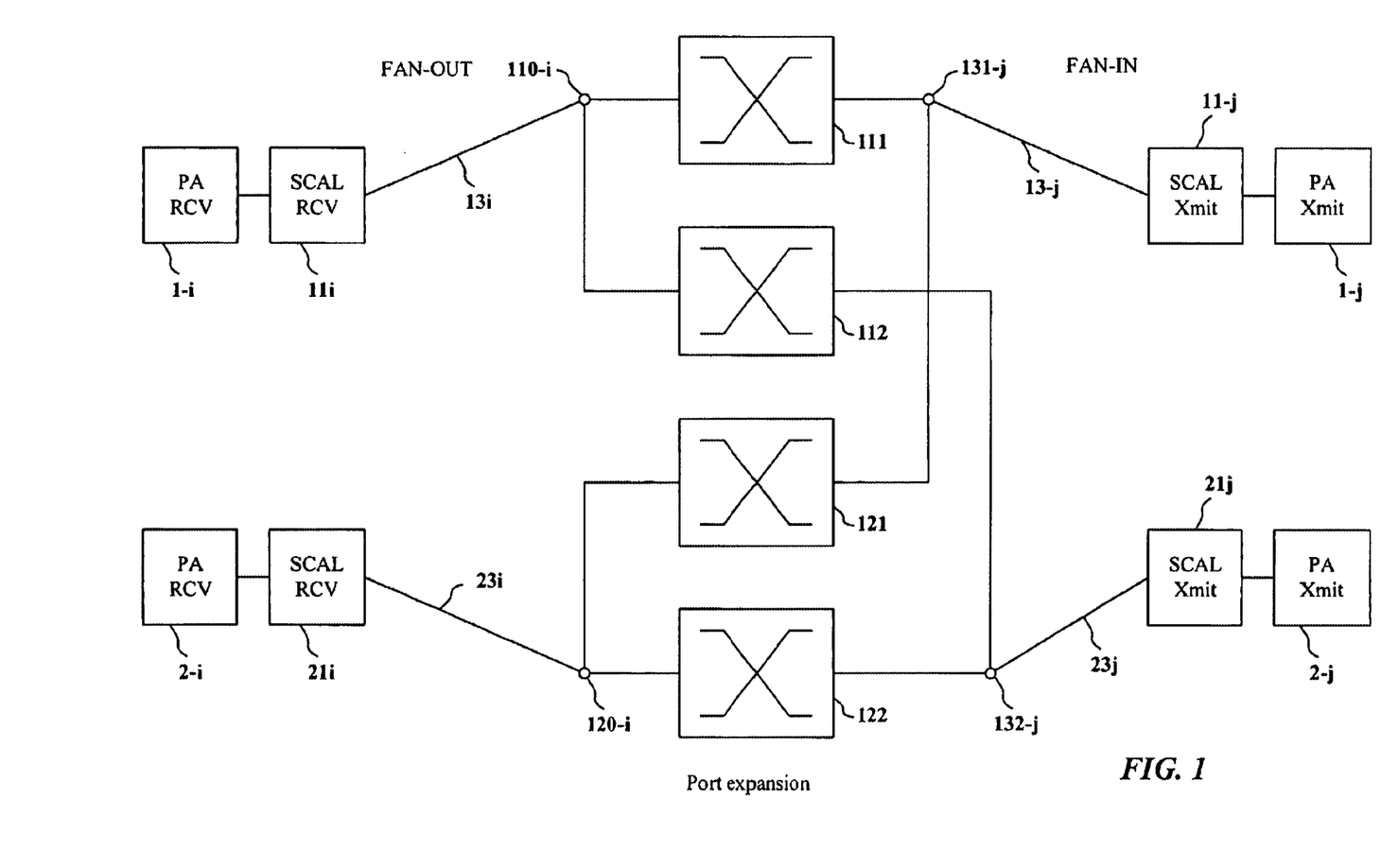
FIG. 1 illustrates a port expansion arrangement of a switching architecture.

In addition to the speed-expansion direction, the port expansion is another direction for an effective combination of individual modules in order to extend, to compensate the physical limitations of a given technology. An example of a port expansion architecture which permits multiplying the number of Port Adapters by two is shown in FIG. 1. A combination of four different Switching Structures or Switch Cores 111, 112, 121 and 122 (each one possibly comprising four switching modules if speed expansion is applied) which are arranged so as to allow the attachment of two sets of Protocol Adapters (PA). Assuming, for instance, that the number of input and output ports is fixed to 16, the port expansion architecture allows a first set of sixteen Protocol Adapters 1-1 to 1-16 and a second set of sixteen Protocol Adapters 2-1 to 2-16 to be connected to the Switch Fabric. More particularly, the input ports i of Switch Cores 111 and 112 are connected together by means of a fan-out circuit 110-$i$ in order to receive the same flow of cells coming from Protocol Adapter 1-$i$ (and, more particularly, the Receive part of the latter). Similarly, Protocol Adapter 2-$i$ produces cells which are transported via the SCAL receive part.

For the sake of clarity, only one port is represented in FIG. 1 which shows that Switch cores 111 and 112 have an input port i that receives the cells coming from the receive part of Protocol Adapter 1-$i$ and transported via SCAL_Receive element 11-*i*, serial long distance transmission link 13-*i* and fan-out circuit 110-*i*. Similarly, Switch cores 121 and 122 has an input port i that receives the cells coming from the receive part of Protocol Adapter 2-*i* and transported via SCAL_Receive element 21-*i*, long distance serial transmission link 23-*i* and fan-out circuit 120-*i*.

With respect to the output ports of the switch cores, and particularly for output port j, the figure shows that Switch cores 111 and 121 are connected to the Xmit part of Protocol Adapter 1-*j* via fan-in circuit 131-*j*, long distance serial transmission link 13-*j* and SCAL Xmit element 11-*j*. Similarly, Switch cores 112 and 122 are connected to the Xmit part of Protocol Adapter 2-*j* via fan-in circuit 132-*j*, long distance serial transmission link 23-*j* and SCAL Xmit element 21-*j*. Long distance serial transmission links 13-*i*, 23-*i*, 13-*j* and 23-*j* are optical or cables that are adapted to the transmission of data rates at high speeds so that Protocol Adapters located at different areas, up to several hundreds of meter, can be attached to the centralized port expansion switching architecture. A known communication link can be found in document "Single-chip 4×500 Mbaud CMOS Transceiver" from A. Widmer et al, in IEEE ISSCC96, Session 7. ATM/SOMET/PAPER FA7.7. Published on Feb. 9, 1996 for providing 1.6 Gigabit/s communication links. When the Switch Core comprises four individual Switching modules arranged in speed expansion, link 13-*i* comprises a set of four different serial links that are separately assigned to the transport of one dedicated Logical Unit.

In addition to the speed expansion mechanism and the buffer expansion mechanism, an arrangement permits the increase of storage of the shared buffer by combining two different modules in a buffer expansion mechanism.

Figure 2:
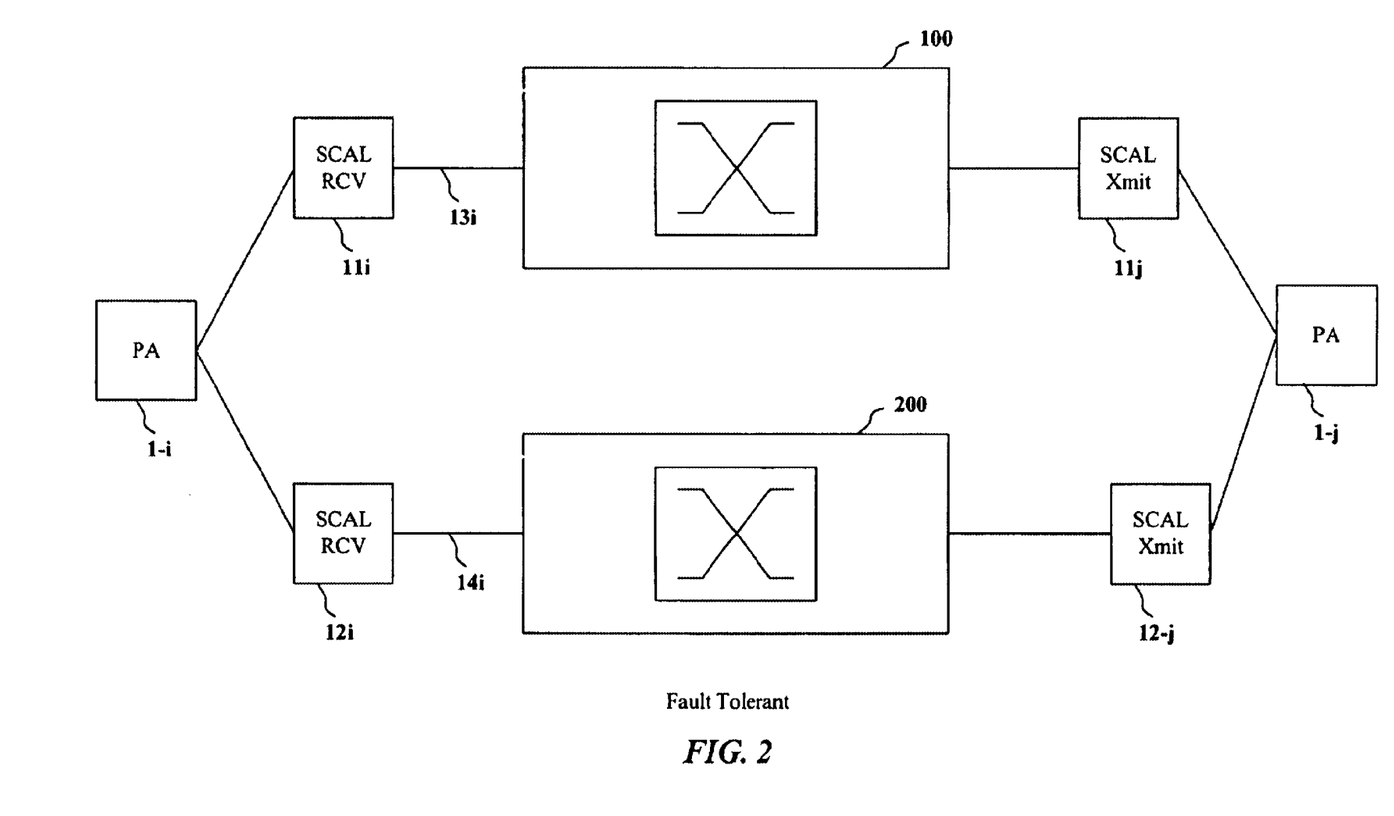
FIG. 2 illustrates a fault-tolerant switching architecture.

New requirements of fault tolerance also require the multiplication of the individual modules. This is shown in a fault tolerance architecture of FIG. 2 which shows two basic Switch Fabrics 100 and 200 which each comprise at least one Switch Core (which can also include multiple switching modules in accordance with the number of Logical Units being considered). Each Protocol Adapter, PA 1-*i* for instance, is attached to both Switch Fabrics 100 and 200 via a SCAL element 11-*i* and 12-*i*. Similar to the illustration of FIG. 1, only one port (i) is represented with respect to the input side of the Switch Fabric, and one port j for the output side. By means of an appropriate masking mechanism, the routing process routing may be altered so as to permit the cells, which are normally transported via one Switch Fabric being considered as active, to be routed via the backup Switch Fabric 200.

The following non-published European patent applications disclose a very effective way of permitting a switch-over from one Switch Fabric to the other one when either a maintenance operation is planned or when breakdown conditions occur.

As a conclusion, it appears that the modern switching architectures, cumulating speed expansion, buffer expansion and fault-tolerance capability tend to substantially multiply the number of individual Switching Modules that are to be used in the Switch Core. Therefore, this substantially increases the difficulty to manage the routing process within so many different Switching Structures that are all associated to different Routing Control Tables for the generation of the bit map value when the cell enters one Switch Core. Obviously, each Routing Control table contains different values and must be efficiently updated in accordance with the ongoing establishment and clearance of connections.

SUMMARY OF THE INVENTION

It is an object of the present invention to provide a management process of the different Routing Control tables that are used in large Switch fabrics made up of numerous Switch cores arranged in speed expansion, port expansion, buffer expansion as well as in fault tolerance architectures.

It is another object of the present invention to provide a Switching architecture that permits the continuous update of the routing tables that are distributed in the different individual Switch Cores.

It is a further object of the present invention to provide a switching control driver for a large shared-buffer Switch Fabric comprising multiple different Switch cores or Switch cores.

These and other objects of the invention are provided by the Switch Fabric system which is defined in the set of claims. Basically, the Switch Fabric system comprises at least one Switch Fabric subsystem which further includes a set of Switch cores elements being arranged in a port expansion for the attachment of at least a first and second sets of Protocol Adapters. At least one common control bus permits communication between the different Switch Cores. The switching control process is achieved by means of a combination of one Protocol Adapter acting as a Primary Switch Controller (PSC) centralizing the communication between the switch and the upper layer application, and the different Switch Core elements which operate as Secondary Switch Controller (SSC). The Primary Switch controller has a complete knowledge of the topology of the switch; e.g., the number of subsystems, the nature of the port expansion, etc.

One particular Switch Core which has a full-duplex communication capability in each Subsystem is assigned the key function to interface communication between the PSC and the other SSC in a same Switch Fabric Subsystem. Preferably, the Switch Fabric system comprises two Switch Fabric Subsystems that are mounted in fault tolerance arrangement so that each Protocol Adapter may receive cells via two parallel paths.

In a preferred embodiment of the invention, each switch core is associated with at least one Routing Control table which is used for producing a bit map value for controlling the internal routing process into the switch core. Effective communication between the Primary Switch Controller, the focal point Secondary Switch Controller and the other SSCs, permits an easy and effective update process of the different Routing Control tables.

Still preferably, each Protocol Adapter is assigned a particular Unicast routing index which it receives from the attached Switch core during an initialization procedure, the Unicast routing index being different from the routing index of said Primary Switch Controller and said Secondary Switch controllers. Each Protocol Adapter further comprises means for requesting the role of the Primary Switch Controller during the initialization procedure.

In a preferred embodiment of the invention, the Primary Switch Controller which has received its Unicast routing index from the Switch Core to which it is attached then transmits a particular cell having a predefined routing index to said Switch Core, so as to inform the latter that it has full-duplex communication capability with the Primary Switch Controller and that it will be used as a focal point for the other Secondary Switch Controllers in the same Subsystem.

DESCRIPTION OF THE ILLUSTRATED EMBODIMENT OF THE INVENTION

Figure 3:
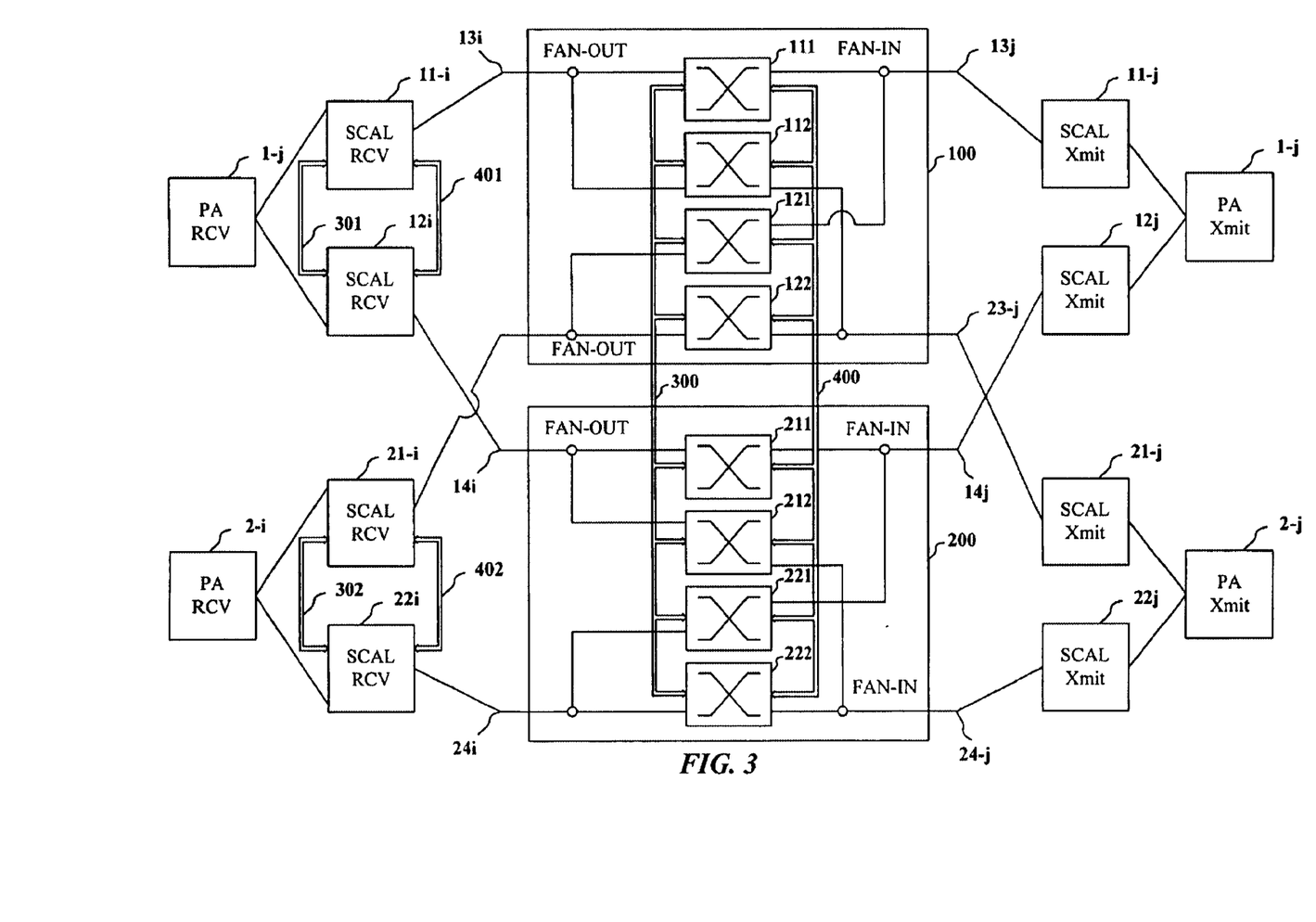
FIG. 3 is a basic view of the preferred embodiment of the invention, providing a fault tolerant switching architecture, with port expansion, with effective control of the different routing tables distributed in the different switching element.

With respect to FIG. 3, there is shown a preferred embodiment of the invention which provides effective control of the routing process in a switching architecture made up of multiple Switch Cores. A Switch Fabric Subsystem 100 comprises a first set of four Switch Cores 111, 112, 121, 122 that are mounted in a port expansion architecture. It should be noted that, for the purpose of clarity, the port expansion architecture is limited to a set of four, thereby allowing an increase of the number of ports by a factor of two. However, it should be possible to use the invention in a port expansion architecture having a expansion factor of four or more instead of two. In the case of four, the number of elementary Switch Cores required would attain sixteen instead of four.

By means of the port expansion architecture, two different sets of Protocol Adapters 1 and 2 can be attached to Switch Fabric Subsystem 100. A first set may comprise sixteen Protocol Adapters 1-1 to 1-16, for instance, (only Protocol Adapter 1-*i* being represented in the FIG. 3) while a second set comprises Protocol Adapters 2-1 to 2-16. For the purpose of clarity only one Protocol Adapter is illustrated and will carry the generic reference 1-*i* (or 2-*i* for the second set of Protocol Adapters) indicating that the latter is associated with port i of the Switch Fabric Subsystem.

With respect to the FIG. 3 Protocol Adapter 1-*i* may generates cells which are transmitted to SCAL_RCV element 11-*i*, which are then transported through long distance link 13-*i* to the Switch Core 111 of Subsystem 100 (as well as 112 by means of the fan-out circuit). Similarly, Protocol Adapter 2-*i* can produce cells which are received by SCAL_RCV element 21-*i*, and then remotely transported to Switch Cores 122 and 121 of Subsystem 100 via serial link 23-*i* and the internal fan-out circuit. With respect to the output port j of Subsystem 100, Switch cores 111 and 121 can generate cells which are transmitted through fan-in circuits and through long distance serial links 13-*j* to SCAL_XMIT element 11-*j* which is attached to the Xmit part of Protocol Adapter 1-*j*. Similarly, in accordance with the port expansion architecture, Switch cores 112 and 122 produce cells which are propagated through fan-in circuits and serial links 23-*j* to SCAL_XMIT element 21-*j* being attached to the Xmit part of Protocol Adapter 2-*j*.

In accordance with the present invention, the switching architecture further comprises a second Subsystem 200 which has a similar structure to that of Subsystem 100. More particular, Subsystem 200 has a set of four Switch cores 211, 212, 221 and 222 which are mounted in a port expansion architecture so that, on one hand, Switch cores 211 and 212 receive via serial link 14-*i* and fan-out circuits the cells provided by SCAL_RCV element 12-*i* attached to Protocol Adapter 1-*i*, while, on the other hand, Switch cores 221 and 222 receive via link 24-*i* the cells provided by SCAL_RCV element 22-*i*, the latter being attached to Protocol Adapter 2-*i*. With respect to output port j, Switch cores 211 and 221 may provide cells to SCAL_Xmit element 12-*j* attached to Protocol Adapter 1-*j* via fan-in circuits in Subsystem 200 and long-distance serial link 14-*j*. Similarly, Switch cores 212 and 222 may transmit cells to remote SCAL_Xmit elements 22-*j* attached to Protocol Adapter 2-*j* via the fan-in circuits and the long-distance serial link 24-*j*.

It should be noted that, generally speaking, the redundant Switch Fabric Subsystems 100 and 200 are located in a centralized area while the Protocol Adapters 1 and 2 are generally located at different remote physical areas in accordance with the distribution of the existing telecommunication lines. The interface between the Protocol Adapters and the Switch Fabrics comprising Subsystems 100 and 200 is achieved by the Switch Core Access Layers (SCAL) elements. Basically, these elements receive the cells provided by the Protocol Adapters and separate the cells in different Logical Units in accordance with the speed expansion arrangement being used, generally four Logical Units. Additionally, the receive part of SCAL elements introduce a set of bytes in the data cell which will be reserved for receiving the bitmap value when the cell enters in the core of Switch Fabric 100 or 200. In the preferred embodiment of the invention, two extra bytes are introduced in the cell for permitting the routing control of a Switch Core of sixteen output ports. SCAL_RCV elements further comprise serializing circuits for performing the serialization of the logical units so that the latter can be transported through serial link 13-23-14-24. Additional 8B/10B coding is introduced in the serial flow of data for enhancing the possibilities of error correction, as well as for creating advanced message services. Details of this particular structure can be found in the above mentioned European application no. 98480006.0.

Additionally, the Subsystems 100 and 200 are mounted in a fault tolerance arrangement, thus making it possible to find two different paths between Port Adapter 1-*i* and Port Adapter 2-*j*.

FIG. 3 shows that each Port Adapter 1-*i* is capable of sending cells to the Xmit part of the sixteen SCAL 11-*j* (for j=1 to 16), the sixteen SCAL 12-*j* (for j=1 to 16), the sixteen SCAL 21-*j* (for j=1 to 16) and at last the sixteen SCAL 22-*j* (for j=1 to 16). Hence, a particular Port Adapter appears capable of communicating with any SCAL element connected to a particular output port of one of the two Subsystem 100 or 200, as well as to any remaining to Port Adapters 1 or 2.

With respect to the communication with the Switch cores, it appears conversely that a given Port Adapter 1-*i* can only communicate with a limited number of Switch cores, which number depends on the port expansion factor being chosen. For a port expansion factor of 2, Port Adapter 1-*i* is only capable of communicating with half the total number of Switch cores. The number is still divided by two when the port expansion ratio attains four.

Let us consider Adapter 1-*i* for instance which is only capable of sending cells to Switch cores 111 and 112 of Subsystem 100, and also Switch cores 211 and 212 of Switch Fabric subsystem 200. Conversely, only the Switch cores 111 and 121 can send cells to the Port Adapter 1-*j*. Therefore, a given Port Adapter 1-*i* is capable of communicating with all the remaining Adapters 1-*j* and 2-*j*, as well as the associated SCAL elements 11-*j*, 12-*j*, 21-*j* and 22-*j*, but only with a limited number of Switch cores.

Also only one of the core Switch Fabrics provides a full duplex transmission for a given port i. For instance, Port adapter 1-*i* can transmit a cell to Switch Core 111 and conversely, it can receive a cell from the latter. In the present invention, one particular Port Adapter is used for handling the function of Primary Switch Controller (PSC), responsible for all the general switch control, while the other elements will serve as Secondary Switch Controllers (SSC) which will communicate via the Primary Switch Control by the channel allowed by the permitting full duplex transmission with the PSC.

Now it will be described the basic operations that are involved in the switch control software, the main target of which is to control the Fault tolerant architecture based on Subsystems 100 and 200. For that purpose, each component of the architecture, particularly each Switch Core and each SCAL, incorporates a specific processor associated with software program for performing the switch control process. All the elements communicate with each other under the general control of a main Switch Control Program (SCP) running in the Primary Switch Controller (PSC), for instance in Protocol Adapter 1-5. The Primary Switch Controller (PSC) has a complete and comprehensive knowledge of all the topology of the Switch architecture while each Secondary Switch Controller (SSC) only has a limited knowledge of that topology. The switch control process is achieved by a sophisticated exchange of information and messages between the PSC and the different SSCs that are located in the different elements of the switch architecture.

The PSC located into Port adapter 1-5 runs the Switch Control Program in association with a user interface program that collects information from the user or the operator of the switching architecture. Therefore, the PSC controller acts as a device driver for the user which is not compelled to have a wide knowledge of the switch.

In the present invention, each Switch Core is fitted with two redundant Serial Control bus 300 and 400, respectively Active (A) and Backup (B), which are used for achieving communication between two switch cores.

Similarly, a set of Serial control busses are used for the communication between two associated redundant SCAL__RCV elements. SCAL__RCV element 11-$i$ and SCAL__RCV element 12-$i$ are connected to each other by means of a first Serial Control bus 301 (Active) and a second serial control bus 401 (Backup). Similarly, SCAL__RCV element 21-$i$ and SCAL__RCV element 22-$i$ are connected to each other by means of Serial Control bus 302 (Active) and 402. For the sake of clarity, the other Serial Busses connecting couples of SCAL 11-12 and 21-22 are not represented in FIG. 3. It should be noticed that these serial Control busses are also used for exchanging information between the two associated elements, among which are the information of a failure detection occurring in one of the two elements. In the preferred embodiment of the invention, all the Serial Control busses are HDLC busses with collision control as defined in the CCITT Recommendations.

The switch control process of the present invention permits achieving two basic and essential functions: first, the routing services permitting the continuous update of the different multicast tables that are distributed in the different Switch cores forming the core of the architecture; and secondly, the control services that achieve the switch-over of the switch when one failure is reported to the Primary Switch controller.

I. Routing Services

The basic function of the Routing Control tables, also called the multicast tables, is to translate the value of the Switch Routing Header (SRH) contained into the incoming cell, into a bitmap value comprising two bytes and which controls the routing process so that the cell is directed towards the appropriate output port destination(s). Obviously there may be only one bitmap generation involved with one particular Switch Core. Actually, in the preferred embodiment of the invention, the routing process involves two successive bitmap generations. A first bitmap is introduced in the cell prior to its entering the switch core. Therefore, the bitmap can be used for controlling the routing process of the switch Core. Additionally, when the cell is directed to the appropriate output port, and before it is transmitted via one of the long-distance serial links 13-$j$, 23-$j$, 14-$j$ or 24-$j$, a new routing control table is addressed so as to supersede the former bit map value with a new one depending on the value of the SRH being located in the cell. This permits a second multicasting possibility which will be performed in the Xmit part of the SCAL elements.

Each adapter 1-$j$ and 2-$j$ (whatever the value of j) is defined by a Unicast routing index which is automatically defined during an initialization procedure within the machine. During the initialization, the Secondary Switch Controllers cause the loading of the Routing Control Tables, at both the input and output of the switch cores, with the Unicast routing indexes assigned to each Protocol Adapter.

More particularly, the SSCs into Switch cores of both Subsystems 100 and 200 load values into the Routing Control tables which are such that a cell that contains a Switch Routing Header characteristics of one Unicast routing index of one Protocol Adapter, is successively directed towards the appropriate SCAL attached to that particular Protocol Adapter. As mentioned above, that may involve two successive bitmap extractions: in a first step the cell is routed under control of a first bit map extracted from a first Routing Control Table located at the input of the Switch core, in order to direct it towards the appropriate corresponding output port. In a second step the cell receives a new bit map that replaces the former and which is used for controlling the routing process of the cell in the remote SCAL element (assumed to be attached to different Protocol Adapters) so that the latter is directed to the particular Protocol Adapter corresponding to the Unicast Routing index.

In the preferred embodiment of the invention, each Switching Structure or Switch core is based on a similar architecture. Each Switch Core comprises processing means and circuitry for performing the Secondary Switching Controller function. Each Switch Core further comprises an additional Core routine that handles the full-duplex communication with a Primary Switch Controller when such a full-duplex communication is possible. As shown in the FIG. 3 of the port expansion architecture, This routine, and the function corresponding thereto, is only activated in two particular Switch Cores, which are cores 111 and cores 211 since it was assumed that Protocol Adapter 1-5 receives the function of the Primary Switch Controller.

With the teaching of the present invention, each Primary Switch Controller (that is to say that in Protocol Adapter 1-5) and each Secondary Switch Controller are also assigned a particular Unicast routing index which is loaded in the different routing control tables in the initialization procedure. Considering, for instance, that the switching architecture based on Subsystems 100 and 200 allows the attachment of 128 Protocol Adapters. In that case, the initialization process may reserve the following range of hexadecimal X'0000' to X'00FF' to characterization of the 128 Protocol Adapters. The Secondary Switch Controllers may receive Unicast Routing index values chosen from the range X'0100' to X017F', while the particular value X'0200' may be reserved to the Primary Switch Controller. In the preferred embodiment of the invention, the function of the Primary Switch Controller is duplicated for fault-tolerance capabilities, and actually two different Unicast routing index—active and backup—characterize the active PSC and the backup or standby PSC.

Therefore, it appears that, while Protocol Adapter 1-5 and the Primary Switch Controller are embodied in the same physical element, the two functions are well isolated. This is a very important aspect of the invention. Adapter 1-5 will receive the cells that contain either the Unicast routing index corresponding to Protocol Adapter 1-5 or the cells characterized by a PSC routing index. But the functional aspects are well separated. Protocol Adapter 1-5 receives two Unicast routing indexes that are different. That permits the other elements not to be aware of the whole topology and different functions assigned to the different elements of the Switch Fabric. If one element wishes to send a cell to Protocol Adapter 1-5 (a cell containing data to be transmitted through the telecommunication line for instance), it will use the Routing index of that particular Protocol Engine. However, when one element wishes to communicate with the Primary Switch Controller, it will use the PSC Unicast routing index that is assigned to the latter, whatever its actual location is. This entails substantial advantages. First, the different routing control functions can be distributed in the different elements of the switch without requiring that each element be aware of the actual topology and functions dedicated to the others. Additionally, this makes possible the concept of routing control driver which permits communication with the functions (i.e., the PSC or the SCC) even without knowing the actual location of those different functions. Further, such arrangement have shown to be very useful for achieving quick and effective switch-over operations when one other elements has to supersede a failing Protocol Adapter which originally has received the function of the Primary Switch Controller.

By means of the assignment of the different Unicast Routing indexes, and loaded into the different Routing Control Tables located in the Switch cores, any SCAL element is capable of communicating with the Primary Switch Controller. Assuming, for instance, that SCAL 11-3 wishes to communicate with the latter. In this case, the SCAL 11-3 generates a cell with a SRH equal to the PSC routing index, that is to say X'0200' for instance. This cell arrives in both cores 111 and 112 where the Routing Control table in each core is addressed for returning the appropriate bitmap value which will control the internal routing process in the Switch core being considered. With the bitmap being extracted, the cell is thus routed towards the output port #5 of Switch core 111 and arrives to the Primary Switch Controller that is located into Protocol Adapter 1-5.

It has been discussed how the different components receive the different functions within the architecture: one particular Protocol Adapter receives the function of the Primary Switch Controller. Optionally, a second may receive the standby function of the Primary Switch controller. The different Switch cores receive the function to act as a Secondary Switch Controller and two particular Switch cores activate their Core internal function for permitting the full duplex communication with the Primary Switch controller. Obviously, this assignment of functions may be performed manually, by an operator distributing the different functions. In the present invention, an automatic procedure is involved for achieving this initialization procedure without any risk of errors.

The automatic initialization procedure is based on a particular routing index which is called SSC_SW_broadcast.

At the power-on, each Protocol Adapter generates a particular cell containing the particular SSC_SW_broadcast routing index which is reserved to that particular initialization procedure. The cell is transmitted to the Switching Structure or core to which it is connected.

Each core that receives that particular SSC_SW_Broadcast routing index in one cell, starts a particular routine which determines the input port where the cell entered in the core. This permits generation of a particular routing index value which the core transmits in a cell which it outputs to the same output port. In this way, the Protocol Adapter receives that particular routing index which it interprets as being its Unicast Routing Index. This is very useful since it avoids manual errors and, additionally, permits immediate and automatic reconfiguration if an additional Protocol Adapter is attached to the Switch Fabric.

When the Protocol Adapter receives its Unicast routing index, it also requests to be assigned the function of the Primary Switch Controller, and the first Protocol Adapter making that request is being granted this functional responsibility. The second one is granted the function of the backup PSC. The Protocol Adapter being assigned the role of the active Primary Switch Controller then transmits again a cell containing the SSC_SW_broadcast routing index as well as an acknowledgment of its new status of PSC, plus the Unicast routing index it received at the beginning of the initialization procedure. This cell is received by the Switch cores 111, 112, 121 and 122. The Secondary Switch cores 111 and 222 which are respectively located into subsystem 100 and 200 are now aware that they can handle full-duplex communication with a Primary Switch controller, and they activate their core function which will be used for the update process of the Routing Control tables as described below. The two SCC which have activated their core routine then sends a message on bus 300 in order to inform the other switch cores of their new status. Therefore, switch cores 112, 121 and 122 of Subsystem 100 are informed via bus 300 that core 111 has become an active core SSC. Switch cores 212, 221 and 222 of Subsystem 200 are similarly informed of the status of core 211. From that instant, any switch core is capable of creating in its Routing Control Table the appropriate bitmap value corresponding to the Primary Switch Controller. When a Switch core has loaded its Routing Control Table with the bitmap value assigned to the PSC (which routing index is X'0200'), it transmits an acknowledgment signal to the Core Secondary Switch Control, either 111 or 211, so that the latter may propagate that information to the Primary Switch Controller.

If a PSC backup is used, a similar procedure is employed to introduce the representation of the routing index of the backup PSC in the routing control tables.

Then, each switching structure performs a logical OR of the bit map corresponding to the PSC which is active with that of the backup PSC. This will result in that the backup Primary Switch Controller will receive a copy of any cell that is directed to the active Primary Switch Controller.

When the initialization procedure, either manual or automatic, is completed, this completes the process of storing the Routing Control tables which are involved for the generation of the bitmap values at both the input and the output of every Switching structure or Switch core. From this instant, the cells can be transported to any element of the Switch Fabric, wherever its particular position is.

It will be described now the particular update of the Routing Control Tables in accordance with the ongoing process of the establishment of new connections.

A user or an application which is located in a upper layer with respect to the switching architecture may request the establishment of a new connection (by the creation of a new tree of directions), or the modification of an existing connection (by suppression one particular Protocol Adapter in one connection). For instance, the upper layer application may request the creation of a new routing index characterized by different Protocol Adapters. This is achieved by means of a NEW_RI message which it transmits to the Primary Switch Controller, with the list of the Protocol Adapters to be introduced in the destination tree for that connection. The list of the Protocol Adapters may be characterized by the list of the Unicast Routing indexes which the NEW_RI message may transmit to the PSC.

The PSC then formats messages which are propagated to the two Subsystems 100 and 200, and which are particularly received by the Core Secondary Switch Controllers in structure 111 and 211 respectively. When the two Core SSC receive that message, they respectively propagate it to the other SSCs that belong to the same Switch Fabric Subsystem via bus 300. Each Secondary Switch Controller located in the Switching Structure can then update their Routing Control Table. This is practically achieved by performing, in each Switching Structure, a logical OR of the bitmap values corresponding to the Unicast routing index of the Protocol Adapters listed in the NEW_RI request. When the request is limited to the amendment of an existing routing index, the amendment is performed by an appropriate logical operation between the bit map assigned to the current routing index with that of the Unicast Routing index being involved in the modification. By this logical operations, the PSC may use a comprehensive set of commands—CREATE, ADD, DELETE etc., which is used for updating the Routing Control tables in the Switching structures.

In the preferred embodiment of the invention, when a Switching structure or Switch core has updated its Routing Control Tables, it propagates an Acknowledgment message via bus 300 to the Core SCC so that the latter may inform the Primary Switch Controller.

The invention permits the user or the application be in some extent implementation independent since the Primary Switch Controller serves as an interface between the user and the different Secondary Switch Controllers. Therefore, like in a 'tier' structure, the PSC acts as a device driver and comprises a certain number of functions, and provides a certain "switch control service" to the user or the application in the upper layer. Assume that the application needs to establish a new routing index, it formulates appropriate information and passes it to the PSC. The latter transmits a request to the Core SSC which passes the latter to the other SSC contained in the Switch Fabric Subsystem and so on. Since the application can be implementation independent, the latter does not need to know whether or not the architecture is based on a port expansion with a factor of two.

In addition to the routing services, the invention provides effective control services.

II. Control Services

The arrangement of the Primary Switch Controller with the Secondary Switch controller produces additional advantageous effects. It permits an effective and simple switch-over mechanism when a maintenance operation is planned in one particular element of the switch. It strongly enhances the possibilities provided by the apparatus disclosed in European application no. 98480039.1.

This is achieved in three successive phases.

1. In a first phase, the new configuration is being transmitted by the Primary Switch controller in accordance with the maintenance operation which is planned on one SCAL element for instance. To achieve this, PSC messages the two Core SSC 111 and 211 which each propagate the request to the other SSC via active bus 300 or backup bus 400. Core SSC 111 propagates the request to SSC 112, 211 and 222 while Core SSC 211 transmits the request to SCC 212, 221 and 222. Each core then generates a broadcast cell so that all the SCAL elements can receive the request for the new configuration.

More particularly, with respect to Subsystem 100, Core SCC 111 transmits a message on a broadcast cell which is received by any SCAL 11-*j*. Similarly, Core SCC 122 transmits the request of the new configuration to a set of sixteen SCAL 21-*j* for j=1 to 16. Each SCAL determines whether the new configuration affects its current status and then sends back an acknowledgment to the attached Switch Cores. In the preferred embodiment of the invention, the acknowledgment uses an auxiliary channel which is allowed by the use of the 8B/10B coding on the long-distance serial link 13, 23, 14 and 24. The SSC elements 112, 121 and 122 can then propagate the acknowledgment to Core SSC 111 which can then inform the PSC of the completion of the first phase in Subsystem 100.

2. The second phase starts with the generation of a Switch_over_Left control signal which is triggered by Switch core 111 in response to a request from the Primary Switch Controller. From that instant, and in accordance with the teaching of the above mentioned patent application, an internal mask mechanism becomes active in the Switch Cores in order to change the value of the bit map that is provided by the Routing Control Table. This permits a change in the status of Subsystem 200 with respect to a particular SCAL element. If the cells were originally directed to one particular Protocol Adapter 2-*j* for instance via a SCAL 21-*j* which is to be replaced, the masking mechanism that is used affects the internal routing process so that the cells are routed now to that Protocol Adapter via the standby SCAL element 22-*j*.

3. A third phase now follows during which each SSC makes a report of the switch-over to the Core SCC 111 and 211, which report is then consolidated by the Primary Switch Controller.

While the invention has been described in terms of preferred embodiments, those skilled in the art will recognize that the invention can be practiced with modification within the spirit and scope of the appended claims.

Having thus described our invention, what we claim is as follows:

1. A switch fabric system including:
   at least one protocol adapter configured as a Primary Switch Controller (PSC), having information identifying the full topology of the switch fabric system;
   at least one sub-assembly configured as a Secondary Switch Controller (SSC), having limited information about the topology of the switch fabric system;
   a full duplex communications channel interconnecting the Primary Switch Controller and the Secondary Switch Controller wherein full duplex communication is established and maintained between said Secondary Switch Controller and said Primary Switch Controller;
   a first Switch Fabric subsystem (100) comprising a first set of Switch cores (111, 112, 121, 122) that are mounted in a port expansion architecture; and said at least one sub-assembly being one particular Switch core having full-duplex communication capability and acting as a focal communication interface point with said PSC; and
   a second Switch Fabric subsystem (200) comprising a second set of Switch cores (211, 212, 221, 222) that are mounted in a port expansion architecture; one particular Switch core belonging to said second Switch Fabric Subsystem having full-duplex capability and acting as a focal communication interface point with said PSC;

each of said first and second Switch Fabric having attachment to the at least one Protocol Adapter and acting as a standby for the other Switch Fabric in case of a breakdown.

2. The Switch Fabric system according to claim 1 wherein each Switch core of said first and said second Switch Fabric Subsystems comprises a controller for addressing a Routing Control Table with the contents of a Switch Routing Header contained in an entering cell, and reading from said table a bitmap value which is introduced into said cell and is used for controlling the routing of the cell into said switch core.

3. The Switch Fabric system according to claim 2 wherein every Protocol Adapter is attached to said Switch Fabric via a Switch Core Access Layer (SCAL) element (11, 12, 21, 22) and a serial communication link.

4. The Switch Fabric system according to claim 3 wherein each Protocol Adapter is assigned a particular Unicast routing index which it receives from the attached Switch core during an initialization procedure, said Unicast routing index being different from the routing index of said Primary Switch Controller and said Secondary Switch controllers.

5. The Switch Fabric system according to claim 4 wherein each Protocol Adapter comprises a controller for requesting the role of the Primary Switch Controller during said initialization procedure, said Secondary Switch Controller (SSC) assigning the function of the Primary Switch Controller (PSC) to the first Protocol Adapter requesting this function.

6. The Switch Fabric system according to claim 5 wherein the Primary Switch Controller which has received its Unicast routing index from the Switch Core to which it is attached then transmits a particular cell having a predefined routing index to said Switch Core, so as to inform it that it has full-duplex communication capability with the Primary Switch Controller and that it is the focal point for the other Secondary Switch Controllers in the same Subsystem.

7. The Switch Fabric system according to claim 6 characterized in that when an application wishes to create a new routing index, it messages said Primary Switch controller which formulates a request which is sent into a cell to the focal Secondary Switch Controller (SSC) of each Switch Fabric Subsystem, for further distribution to each Switch Core element.

8. The Switch Fabric system according to claim 7 characterized in that one Protocol Adapter is assigned to act as a standby for said Primary Switch Controller (PSC) and receives any cell directed to said Primary Switch Controller.

9. The Switch Fabric system according to claim 8 characterized in that said controller of said Primary Switch Controller initiates a request for switch-over which is firstly transmitted to the focal Secondary Switch Controller into both Subsystems 100 and 200 for further distribution to any Switch Core elements and SCAL elements.

* * * * *